US012637230B1

(12) United States Patent　　　(10) Patent No.: US 12,637,230 B1
Solter-Hunt　　　　　　　　　　(45) Date of Patent: May 26, 2026

(54) ENGINE PROXIMITY ALERT SYSTEM AND ASSOCIATED METHOD

(71) Applicant: The Boeing Company, Arlington, VA (US)

(72) Inventor: Sierra Solter-Hunt, Portland, OR (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/601,781

(22) Filed: Mar. 11, 2024

(51) Int. Cl.
　　*G08G 5/00*　　　(2025.01)
　　*B64D 45/00*　　　(2006.01)
　　　　　　(Continued)

(52) U.S. Cl.
　　CPC .............. *B64D 45/00* (2013.01); *G01D 5/26* (2013.01); *G08B 21/02* (2013.01); *G08B 21/22* (2013.01); *B64D 2045/0095* (2013.01)

(58) Field of Classification Search
　　CPC ........ H02H 3/006; H02H 7/04; H02H 1/0007; H02H 3/00; H02H 5/04; H02H 7/008; H02H 1/00; H02H 5/00; H02H 6/00; H02H 7/00; H02H 9/00; H02H 11/00; H02H 99/00; G06F 16/245; G06F 16/258; G06F 21/554; G06F 21/88; G06N 20/00; G06N 5/04; G06N 3/00; G06N 5/00; G06N 7/00; G06N 10/00; G06N 99/00; H02J 13/00001; H02J 13/00002; H02J 13/0004; H02J 2203/20; H02J 3/00; H02J 3/003; Y02E 60/00; Y04S 10/20; Y04S 10/30; Y04S 10/40; Y04S 40/20; E02F 9/2033; E02F 9/205; E02F 9/24; E02F 9/262; E02F 9/264; E02F 9/265; G06T 2207/30261; G06T 7/70; G08B 13/126; G08B 13/1427; G08B 25/008; G08B 29/16; G08B 29/185; G08B 21/06; A61B 2560/0209; A61B 5/01; A61B 5/1116; A61B 5/4088; A61B 5/4561; A61B 5/4806; A61B 5/4809; A61B 5/4815; A61B 5/4818; A61B 5/4842; A61B 5/7282; A61F 5/56; A61M 2021/0005; A61M 2021/0022; A61M 2021/0083; F23J 2213/70; F23N 1/022; F23N 2223/38; F23N 2231/00; F23N 2231/20; F23N 2900/05001;

(Continued)

(56)　　　　　References Cited

U.S. PATENT DOCUMENTS 4,248,093 A　*　2/1981　Andersson ............. G01H 9/002
　　　　　　　　　　　　　　　　　　73/656
6,880,784 B1 *　4/2005　Wilkinson ........... G05D 1/0661
　　　　　　　　　　　　　　　　　　244/76 R (Continued)

*Primary Examiner* — Daniel Previl
(74) *Attorney, Agent, or Firm* — Kunzler Bean & Adamson

(57)　　　　　　ABSTRACT

An aircraft engine alert system and associated method are disclosed. The aircraft engine alert system includes an aircraft including at least one engine having an engine inlet. The aircraft engine alert system also includes a sensor that is coupled to the engine. The sensor is configured to detect a movable object and determine a distance between the movable object and the engine inlet. The aircraft engine alert system further includes an alert generating device in electrical communication with the sensor and configured to issue an alert to the movable object when the engine is in use and when the movable object is within a predetermined range of the engine inlet.

20 Claims, 4 Drawing Sheets

(51) Int. Cl.
| | |
|---|---|
| *G01D 5/26* | (2006.01) |
| *G08B 21/02* | (2006.01) |
| *G08B 21/22* | (2006.01) |

(58) Field of Classification Search
CPC ........... F23N 2900/05002; F23N 5/003; F23N 5/242; F23N 1/00; F23N 3/00; F23N 5/00; F23N 2221/00; F23N 2223/00; F23N 2225/00; F23N 2227/00; F23N 2229/00; F23N 2233/00; F23N 2235/00; F23N 2237/00; F23N 2239/00; F23N 2241/00; F23N 2900/00; F24H 15/20; F24H 15/355; F24H 15/395; F24H 15/45; F24H 9/2042; G01N 33/004; G16H 15/00; G16H 20/00; G16H 50/20; G16H 50/50; G16H 50/70; G16H 10/00; G16H 30/00; G16H 40/00; G16H 50/00; G16H 70/00; G16H 80/00

USPC ....... 340/945, 948, 950, 951–953, 963, 964, 340/972–973, 979, 981, 991–994, 995.28
See application file for complete search history.

(56) References Cited

U.S. PATENT DOCUMENTS

| | | | | |
|---|---|---|---|---|
| 2005/0119802 | A1* | 6/2005 | Kane | G01C 23/005 701/9 |
| 2009/0303836 | A1* | 12/2009 | Rottenwohrer | A01M 29/18 367/139 |
| 2012/0026016 | A1* | 2/2012 | Mitchell | G06Q 10/20 340/572.1 |
| 2013/0025348 | A1* | 1/2013 | Rajamani | G01N 15/0266 73/28.01 |
| 2013/0158991 | A1* | 6/2013 | Dong | B64D 45/0051 704/235 |
| 2021/0261270 | A1* | 8/2021 | Heafitz | B64D 47/02 |

* cited by examiner

ENGINE PROXIMITY ALERT SYSTEM AND ASSOCIATED METHOD

FIELD

This disclosure relates generally to an alert system and more particularly to an engine proximity alert system for an aircraft.

BACKGROUND

The variability from aircraft to aircraft of the size and placement of aircraft engines on an aircraft, and the highly mobile nature of aircraft, often pose challenges in accurately assessing the proximity of movable objects. Preventing movable objects from getting within a warning zone of an aircraft engine is desired.

SUMMARY

The subject matter of the present application has been developed in response to the present state of the art. Generally, the subject matter of the present application has been developed to provide an aircraft engine alert system and associated method.

Disclosed herein in an aircraft engine alert system. The aircraft engine alert system includes an aircraft including at least one engine having an engine inlet. The aircraft engine alert system also includes a sensor coupled to the at least one engine. The sensor is configured to detect a movable object and determine a distance between the movable object and the engine inlet. The system further includes an alert generating device in electrical communication with the sensor and configured to issue an alert to the movable object when the at least one engine is in use and when the movable object is within a predetermined range of the range inlet. The preceding subject matter of this paragraph characterizes example 1 of the present disclosure.

The predetermined range is between, and inclusive of, fifteen feet and thirty feet. The preceding subject matter of this paragraph characterizes example 2 of the present disclosure, wherein example 2 also includes the subject matter according to example 1, above.

Within the predetermined range, a pre-warning zone begins a first distance away from the engine inlet and ends a second distance away from the engine inlet and a warning zone begins at the second distance away from the engine inlet and ends at the engine inlet. The first distance is greater than the second distance. The alert generating device is configured to issue a pre-warning alert when the movable object is within the pre-warning zone and issue a warning alert when the movable object is within the warning zone. The pre-warning alert is different from the warning alert. The preceding subject matter of this paragraph characterizes example 3 of the present disclosure, wherein example 3 also includes the subject matter according to any of examples 1-2, above.

The first distance is between, and inclusive of, fifteen feet to thirty feet from the engine the engine inlet. The second distance is between, and inclusive of, ten feet to twenty feet from the engine inlet. The preceding subject matter of this paragraph characterizes example 4 of the present disclosure, wherein example 4 also includes the subject matter according to example 3, above.

The sensor includes at least one active infrared sensor. The preceding subject matter of this paragraph characterizes example 5 of the present disclosure, wherein example 5 also includes the subject matter according to any of examples 1-4, above.

The alert issued by the alert generating device includes at least one of an audible alert and a visual alert. The preceding subject matter of this paragraph characterizes example 6 of the present disclosure, wherein example 6 also includes the subject matter according to any of examples 1-5, above.

The data from the sensor is transmitted wirelessly to a central monitoring system for remote crew notification. The preceding subject matter of this paragraph characterizes example 7 of the present disclosure, wherein example 7 also includes the subject matter according to any of examples 1-6, above.

The aircraft is positioned on a ground surface. The movable object is an individual. The preceding subject matter of this paragraph characterizes example 8 of the present disclosure, wherein example 8 also includes the subject matter according to any of examples 1-7, above.

The alert generating device is a headset configured to be worn by the individual. The sensor is configured to wirelessly transmit a signal to the headset of the individual to issue the alert to the headset of the individual. The preceding subject matter of this paragraph characterizes example 9 of the present disclosure, wherein example 9 also includes the subject matter according to example 8, above.

The aircraft is in flight. The movable object is an animal. The preceding subject matter of this paragraph characterizes example 10 of the present disclosure, wherein example 10 also includes the subject matter according to any of examples 1-9, above.

The predetermined range for issuing the alert is adjustable. The predetermined range includes a first predetermined range when the aircraft is positioned on the ground surface. The predetermined range includes a second predetermined range when the aircraft is in flight. The first predetermined range is different from the second predetermined range. The preceding subject matter of this paragraph characterizes example 11 of the present disclosure, wherein example 11 also includes the subject matter according to any of examples 1-10, above.

The alert generating device is configured to stop the alert to the movable object when the movable object moves outside of the predetermined range of the engine inlet. The preceding subject matter of this paragraph characterizes example 12 of the present disclosure, wherein example 12 also includes the subject matter according to any of examples 1-11, above.

The sensor is configured to differentiate between different types of the movable object. The alert issued by the alert generating device corresponds to a specific one of the different types of the movable object. The preceding subject matter of this paragraph characterizes example 13 of the present disclosure, wherein example 13 also includes the subject matter according to any of examples 1-12, above.

Further disclosed herein is another example of an aircraft engine alert system. The system includes an aircraft including at least one engine having an engine inlet. The system also includes a sensor coupled to the at least one engine. The sensor is configured to detect a movable object and determine a distance between the movable object and the engine inlet. The system further includes a headset in electrical communication with the sensor and configured to be worn by an individual. The sensor is configured to wirelessly transmit a signal to the headset of the individual is issue an alert to the movable object, when the at least one engine is in use and when the individual is within a predetermined range of the engine inlet. The preceding subject matter of this paragraph characterizes example 14 of the present disclosure.

The aircraft engine alert system includes an alert generating device coupled to the at least one engine and in electrical communication with the sensor. The alert generating device is configured to issue an engine-based alert to the movable object when the at least one engine is in use and when the movable object is within the predetermined range of the engine inlet. The preceding subject matter of this paragraph characterizes example 15 of the present disclosure, wherein example 15 also includes the subject matter according to example 14, above.

Within the predetermined range, a pre-warning zone begins a first distance away from the engine inlet and ends a second distance away from the engine inlet and a warning zone begins at the second distance away from the engine inlet and ends at the engine inlet. The first distance is greater than the second distance. The headset is configured to issue a pre-warning alert when the movable object is within the pre-warning zone and issue a warning alert when the movable object is within the warning zone. The pre-warning alert is different from the warning alert. The preceding subject matter of this paragraph characterizes example 16 of the present disclosure, wherein example 16 also includes the subject matter according to any of examples 14-15, above.

Further disclosed herein is a method of alerting a movable object of a proximity of the movable object to an aircraft engine in use. The method includes the step of detecting, using a sensor, a presence of the movable object within a predetermined range of an engine inlet of an engine of an aircraft when the engine is in use. The method also includes the step of issuing an alert by an alert generating device, in electrical communication with the sensor, to the movable object within the predetermined range. The preceding subject matter of this paragraph characterizes example 17 of the present disclosure.

The step of detecting, using the sensor, the presence of the movable object within the predetermined range further includes determining if the movable object is within a pre-warning zone or a warning zone of the engine inlet. The step of issuing the alert by the sensor to the movable object further includes issuing a pre-warning alert when the movable object is within the pre-warning zone and issuing a warning alert when the movable object is within the warning zone. The preceding subject matter of this paragraph characterizes example 18 of the present disclosure, wherein example 18 also includes the subject matter according to example 17, above.

The alert issued by the alert generating device includes at least one of an audible alert and a visual alert. The preceding subject matter of this paragraph characterizes example 19 of the present disclosure, wherein example 19 also includes the subject matter according to any of examples 17-18, above.

The method includes wirelessly transmitting the alert to a central monitoring system for remote crew notification. The preceding subject matter of this paragraph characterizes example 20 of the present disclosure, wherein example 20 also includes the subject matter according to any of examples 17-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the subject matter of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the subject matter of the present disclosure, however, absent an express correlation to indicate otherwise, an implementation may be associated with one or more examples.

Disclosed herein are examples of an aircraft engine alert system and associated method. The following provides some features of at least one example of the aircraft engine alert system and associated method. The aircraft engine alert system is configured to alert a movable object of its proximity to an engine inlet of an aircraft engine. By providing alerts, the aircraft engine alert system is designed to enhance the safety of both the aircraft and nearby moving objects, providing timely warnings when the moving object approaches a specified distance from the engine inlet. The proactive alert system aims to prevent unintended interactions with the engine, thus creating a secure environment for both airborne and ground operations. In other words, the aircraft engine alert system serves as a preemptive measure, contributing to the overall safety of movable objects as well as promoting the longevity of engine components.

Figure 1:
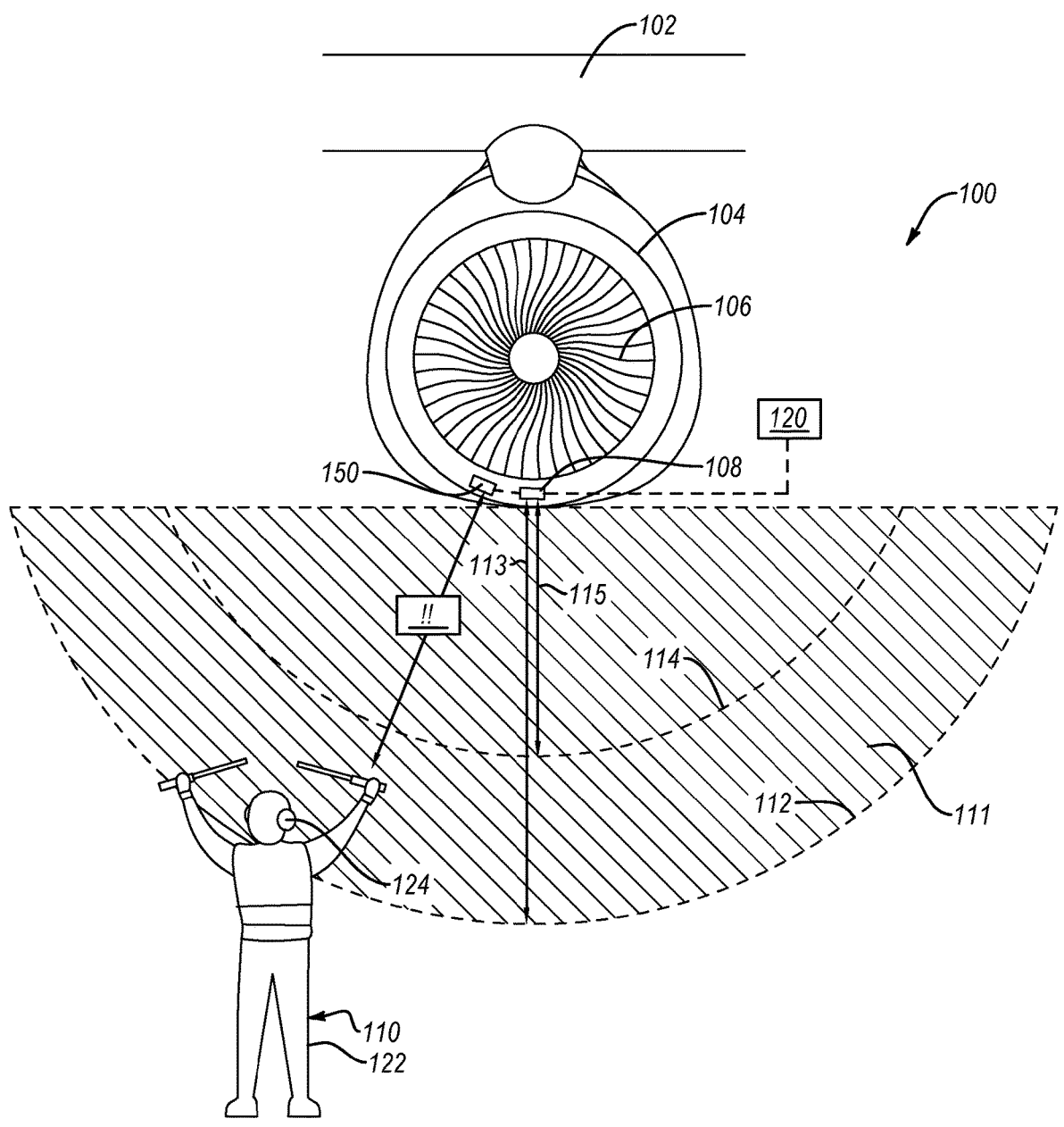
FIG. 1 is a schematic perspective view of one example of an aircraft engine alert system, according to one or more examples of the present disclosure.

Referring to FIG. 1, one example of an aircraft engine alert system 100 is shown. The aircraft engine alert system 100 includes an aircraft 102 having at least one engine 104. A location of the engine 104 on the aircraft 102 can vary depending on the type and design of the aircraft 102. For example, in some examples, the engine 104 of the aircraft 102 is attached to an underwing surface of a wing of the aircraft 102. In other examples, the engine 104 of the aircraft 102 is located in other positions on the aircraft 102, such as mounted on the fuselage or located at the front of the aircraft 102. Additionally, the aircraft 102 may have multiple engines, where the engine 104 is one of the multiple engines of the aircraft 102. For example, the aircraft 102 may have one engine coupled to each wing of the aircraft 102, such that the aircraft 102 has two engines. In other examples, the aircraft 102 may have multiple engines coupled to each wing of the aircraft 102, such that the aircraft 102 has at least two engines coupled to each wing of the aircraft 102. Regardless of the number of engines, each engine 104 has an engine inlet 106, located at a front (i.e. forward-facing) surface of the engine 104, that is responsible for receiving, directing, and regulating airflow into the engine 104.

The aircraft engine alert system 100 also includes a sensor 108 and an alert generating device 150. The sensor 108 is configured to detect a movable object 110 and determine a distance between the movable object 110 and the engine inlet 106. That is, the sensor 108 is equipped with objection detection and distance calculation capabilities, enabling the sensor 108 to detect the movable object 110 and determine the distance from the engine inlet 106. The alert generating device 150 is configured to issue an alert 109 to a movable object 110 when the engine 104 is in use, and when the distance between the movable object 110 and the engine inlet 106, as detected by the sensor 108, is within a predetermined range 111 of the engine inlet 106. The sensor 108 communicates real-time data on the detected distance between the movable object 110 and the engine inlet 106 to the alert generating device 150. Accordingly, the alert generating device 150 issues the alert 109 to the movable object 110 in real-time, when the movable object 110 is within the predetermined range 111. In other words, the sensor 108 is in electrical communication with the alert generating device 150 and is configured to receive data from the sensor 108. In some examples, the sensor 108 and the alert generating device 150 are separate devices in wired or wireless communication. In other examples, the sensor 108 and the alert generating device 150 are integrating into a singular device, featuring object detection, distance calculation and alert-generating capabilities.

The sensor 108 is coupled to the engine 104. In some examples, the alert generating device 150 is also coupled to the engine 104. The sensor 108 and the alert generating device 150, when coupled to the engine 104, may be coupled to the engine 104 by any coupling means. Coupling means may include but is not limited to, direct attachment, using brackets, mounts, or other attachment mechanisms, or embedded attachment, where the sensor is incorporated within the engine structure during the engine manufacturing process. Additionally, the sensor 108 and the alert generating device 150 may be coupled to any location on or within the engine 104. For example, the sensor 108 may be coupled to an exterior surface of a cowling, coupled within the engine inlet 106, integrated into a nacelle, or embedded within the engine sensor housing. The sensor 108 and the alert generating device 150 may be powered through a wired connection, drawing power from the aircraft 102, such as the aircraft central system, powered through a wireless connection, such as electromagnetic induction or resonance, or self-powered via a battery or other power source housed within one or both of the sensor 108 and the alert generating device 150.

In some examples, the aircraft engine alert system 100 may include a plurality of sensors 108. For example, for an aircraft 102 that has multiple engines, each engine 104 may have at least one sensor 108 coupled thereto. Accordingly, each sensor of the plurality of sensors 108, along with its corresponding predetermined ranges, will be specific to the engine 104 to which the corresponding sensor 108 is attached. In other words, for an aircraft 102 having two engines, a first engine with a corresponding first sensor, and a second engine with a corresponding second sensor, the first sensor will be specific to the first engine, and the second sensor will be specific to the second engine. Additionally, in some examples, multiple sensors, of the plurality of sensors 108, may be coupled to a corresponding engine. That is, more than one sensor may be coupled to a single engine at distinct locations about the single engine. The use of multiple sensors coupled to each engine may promote redundancy and reliability of the aircraft engine alert system 100. Moreover, in some cases, each engine may be equipped with multiple sensors, comprising a variety of sensor types. The variety of sensor types can collectively enhance the detectability, extend the range, and/or optimize the overall performance of the aircraft engine alert system 100.

In some examples, the aircraft engine alert system 100 includes a single alert generating device 150. That is, when the aircraft 102 has a plurality of sensors 108, each one of the plurality of sensors 108 communicates with the single alert generating device 150, ensuring a singular alert is issued when the movable object 110 is within the predetermined range 111 of any one of the plurality of sensors 108. In other examples, the aircraft engine alert system 100 includes a plurality of alert generating devices 150. For example, each one of the plurality of alert generating devices 150 corresponds to at least one of the plurality of sensors 108. For example, for an aircraft 102 that has multiple engines, each engine 104 may have at least one alert generating device 150 coupled thereto. Accordingly, in some examples, each alert generating device 150 may be specific to the engine 104 to which it is attached.

The sensor 108 may be any one of a variety of sensors types that is capable of determining the presence or absence of the movable object 110 within the predetermined range 111 of the engine inlet 106. In some examples, the sensor 108 is an infrared sensor, such as a passive or active infrared sensor. The infrared sensor functions by detecting infrared radiation emitted or reflected by the movable object, allowing the sensor 108 to discern the presence of the movable object 110 within the predetermined range 111. In other examples, the sensor 108 may include, but is not limited to, an ultrasonic sensor, a laser sensor, a vision-based system (e.g., camera), or a radar sensor. Moreover, as mentioned above, a single engine may be equipped with a plurality of sensors, with at least one sensor being a different sensor type than others of the plurality.

The alert generating device 150 is configured to issue the alert 109 to the movable object 110 when the engine 104 is in use and when the movable object 110 is within the predetermined range 111, as detected by the sensor 108, of the engine inlet 106. As used herein, an alert 109 includes any type of signal that can notify a movable object of its proximity to the engine 104. In some examples, the alert 109 is a visual alert, such as a solid, flashing, or pulsing light. The visual alert is configured to draw immediate visual attention of the movable object 110 and notify the movable object 110 of its proximity relative to the engine inlet 106. In other examples, the alert 109 is an audible alert, such as a warning sound, an auditory alarm, or an automated voice alert. The audible alert is configured to be remain audible despite environments characterized by high ambient noise levels from the engine 104 or the aircraft surrounding. In other words, the alert 109, regardless of the type of alert, is configured with an intensity and/or frequency that is capable of effectively and promptly notifying the movable object 110 about its proximity to the engine inlet 106. Moreover, the intensity and/or frequency of the visual alert or audible alerts may be configured to vary based on the proximity of the movable object 110 to the engine inlet 106. For example, the intensity and/or frequency of the alert 109 may escalate as the movable object 110 approaches the engine inlet 106. In other examples, the alert 109 may be a combination of signals, such as an audible alert and a visual alert.

Figure 3:
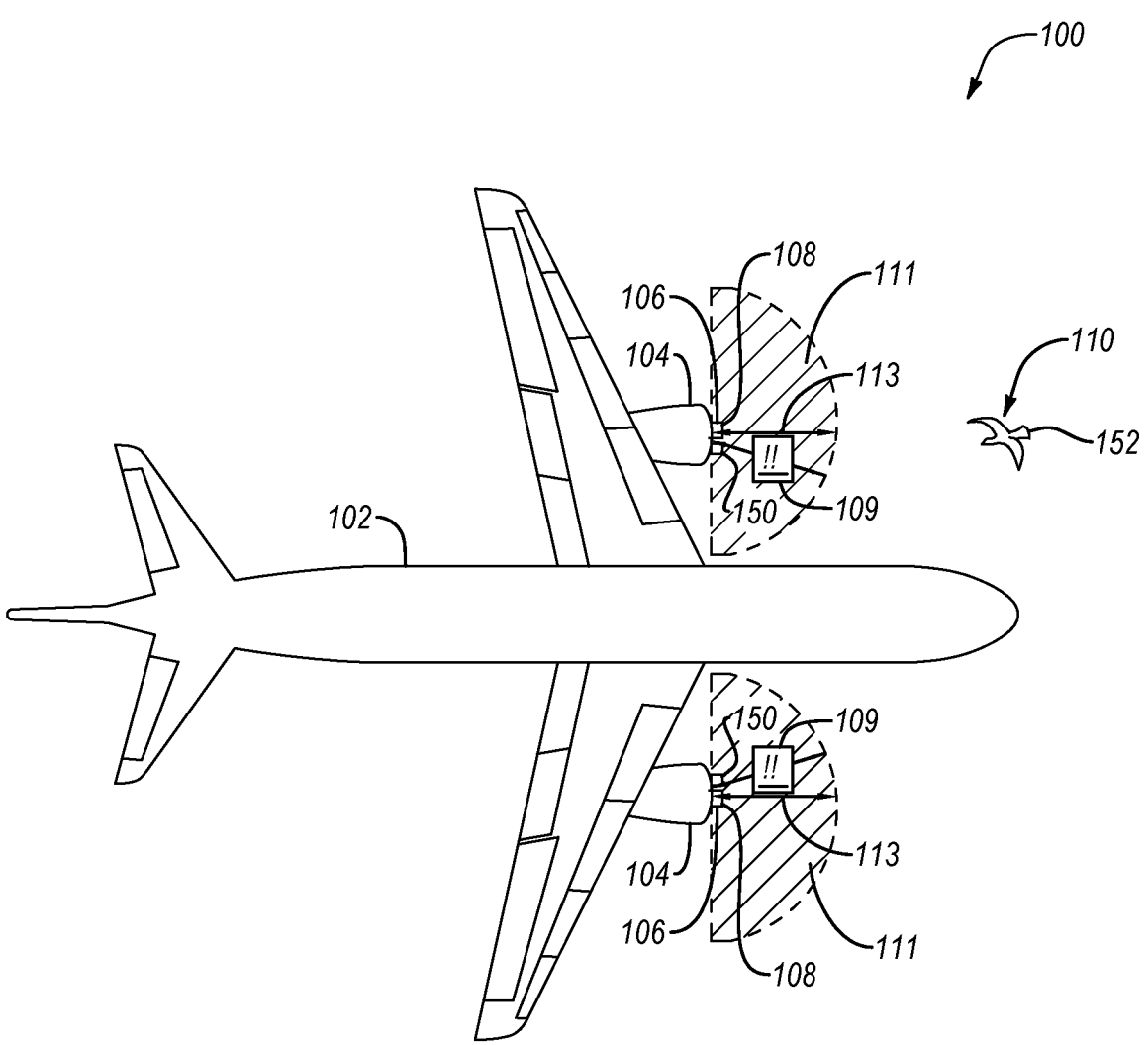
FIG. 3 is a schematic perspective view of another example of an aircraft engine alert system, according to one or more examples of the present disclosure.

As used herein, a movable object 110 refers to any object capable of moving from one object to another or being relocated or moved from one location to another. When the aircraft 102 is on a ground surface, the movable object 110 may include individuals (i.e., people) including ground crew members, technicians, or other personnel engaged in activities around the aircraft 102. Additionally, the movable object 110 may include ground support equipment, service vehicles, debris, and other inanimate objects. In instances involving an inanimate object within the predetermined range 111 of the engine inlet 106, the alert 109 issued by the sensor 108 may be configured to notify a nearby individual of the location of the inanimate object, enhancing situational awareness and safety protocols of inanimate object around the aircraft 102. When the aircraft 102 is in flight, as shown in FIG. 3, the movable object 110 may include animals, such as birds 152. In this case, the aircraft engine alert system 100 is configured to detect and notify a bird 152 or birds within the predetermined range 111 of the engine inlet 106. The alert 109, issued by the sensor 108 upon detecting a bird 152 within the predetermined range 111, serves to alert the bird 152 about the approaching aircraft 102 and potentially prompt the bird 152 to redirect its flight path away from the engine inlet 106, to mitigate the risk of potential bird strikes. Accordingly, when the movable object 110 is an animal, such as the bird 152, the alert 109 may include a frequency or intensity that is disrupting or uncomfortable to the animal, thus prompting the animal to change positions to move away from the disrupting or uncomfortable alert and out of proximity of the engine inlet 106. For example, the alert 109 may be a pulsing light configured to alert the bird 152 and prompt the bird 152 to change its flight path.

In some examples, the sensor 108 is configured to differentiate between different types of movable objects 110 and communicate that data to the alert generating device 150. Accordingly, the alert 109 issued by the alert generating device 150 may be specific to the type of movable object 110. That is, the alert generating device 150 can tailor the alert 109 based on the specific type of movable object, offering a customized response. For example, the alert 109 may vary depending on whether the movable object 110 is an individual, ground support equipment, or animal. Different types of movable objects may exhibit distinct responses to specific alerts, for example, alerting a person verses an animal. Moreover, in the case of an inanimate object, the alert 109 may be configured to notify nearby individuals of the inanimate object's proximity, clarifying that the movable object 110 is an inanimate object rather than an individual.

The aircraft engine alert system 100 is configured to alert the movable object 110 when it is within the predetermined range 111. The predetermined range 111 refers to a predefined area around the engine inlet 106 within which the aircraft engine alert system 100 monitors the presence of movable objects 110 and issues the alert 109 accordingly. The predetermined range 111 is set based on engineering considerations, safety requirements, and the specific capabilities of the alert system to ensure effective detection and timely warnings. The predetermined range 111 defines an arc-shaped monitoring zone, or semi-circular area, extending outward from the sensor 108, and encompassing a space in front of the engine inlet 106. In some examples, the predetermined range 111 for issuing the alert 109 is adjustable. That is, the predetermined range 111 may be adjustable depending on different conditions of the aircraft 102 (e.g., the speed/power at which the engine is operating). This flexibility allows for the predetermined range 111 to be tailored to different operational scenarios of the aircraft 102. For example, when the aircraft 102 is positioned on the ground surface, the predetermined range 111 may include a first predetermined range, and when the aircraft 102 is in flight, the predetermined range 111 may assume a second predetermined range. The first predetermined range is different from the second predetermined range. For instance, the first predetermined range may be smaller when compared to the second predetermined range, as a more expansive range may be preferred during flight operations. In some examples, the predetermined range 111 is between, and inclusive of, fifteen feet to thirty feet of the engine inlet 106. In other examples, the predetermined range 111 is between, and inclusive of, fifteen to fifty feet of the engine inlet 106. In yet other examples, the predetermined range 111 is up to one hundred feet.

The predetermined range 111 may include multiple zones, such as a pre-warning zone 112 and a warning zone 114. Within the predetermined range 111, the pre-warning zone 112 begins a first distance 113 away from the engine inlet 106 and ends a second distance 115 away from the engine inlet 106, and the warning zone 114 begins at the second distance 115 away from the engine inlet 106 and ends at the engine inlet 106. Accordingly, the pre-warning zone 112 extends at a greater distance from the engine inlet 106 than the warning zone 114, as the warning zone 114 is between the pre-warning zone 112 and the engine inlet 106. In other words, the first distance 113 is greater than the second distance 115. In some examples, the first distance 113 is between, and inclusive of, fifteen feet and thirty feet from the engine inlet 106 and the second distance 115 is between, and inclusive of, ten feet and twenty feet from the engine inlet 106. In other examples, the first distance 113 is between, and inclusive of, fifteen feet and fifty feet from the engine inlet 106. In yet other examples, such as when the aircraft 102 is in flight, the first distance 113 is up to one hundred feet of the engine inlet 106.

Figure 2A:
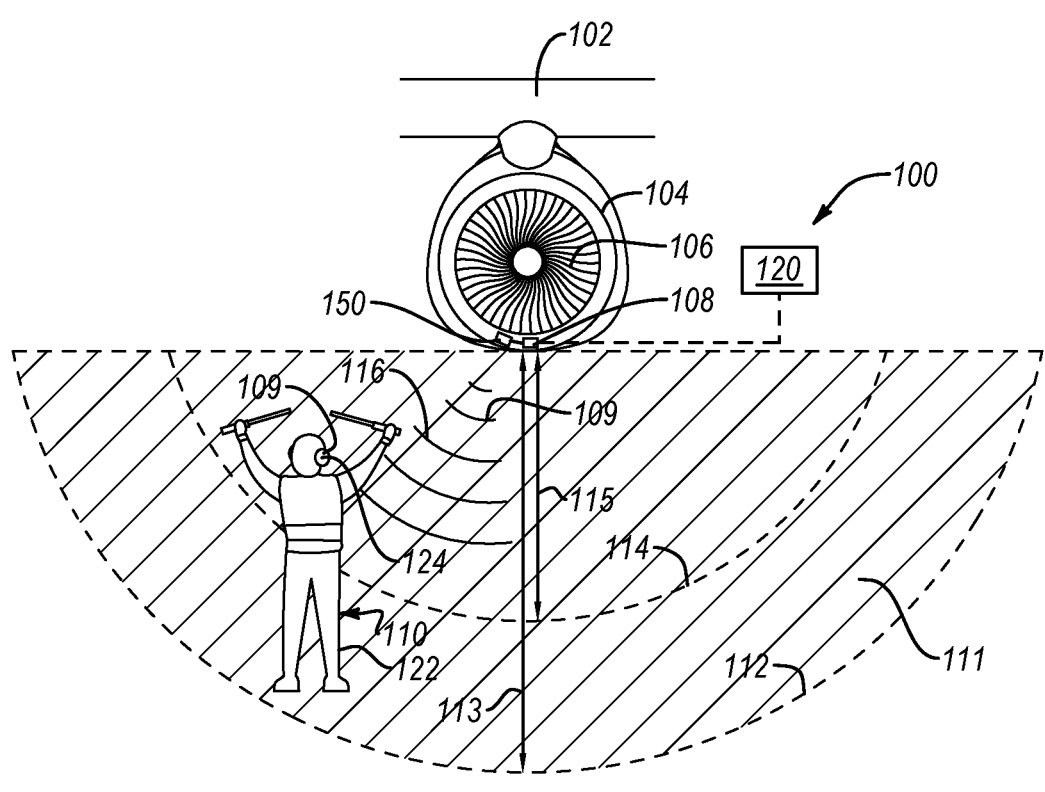
FIG. 2A is a schematic perspective view of the aircraft engine alert system of FIG. 1, with a movable object within a pre-warning zone, according to one or more examples of the present disclosure.

Referring to FIG. 1, the movable object 110 is an individual 122 who is positioned outside the predetermined range 111. Accordingly, the sensor 108 is not currently detecting the movable object 110 within the predetermined range 111 and the alert generating device 150 is not issuing the alert 109. However, when the movable object 110 moves within the predetermined range 111 the sensor is configured to detect the distance between the movable object 110 and the engine inlet 106 and the alert generating device 150 is configured to issue the alert 109. As shown in FIG. 2A, the individual 122 is within the predetermined range 111, specifically the pre-warning zone 112. Accordingly, the alert generating device 150 is issuing the alert 109, such as a pre-warning alert 116, which initiated immediately upon the individual 122 entering the pre-warning zone 112. In other words, the pre-warning alert 116 is issued when the individual 122 is at or beyond the first distance 113. In some examples, the alert generating device 150 is configured to continuously issue the pre-warning alert 116 until the movable object 110 moves outside of the pre-warning zone 112, ensuring continuous awareness and warning until a safe distance of the movable object 110 is reestablished. Additionally, in some examples, the alert generating device 150 is configured to stop the alert 109 to the movable object 110 when the sensor 108 notifies the alert generating device 150 that the movable object 110 has moved outside of the predetermined range 111 of the engine inlet 106.

Figure 2B:
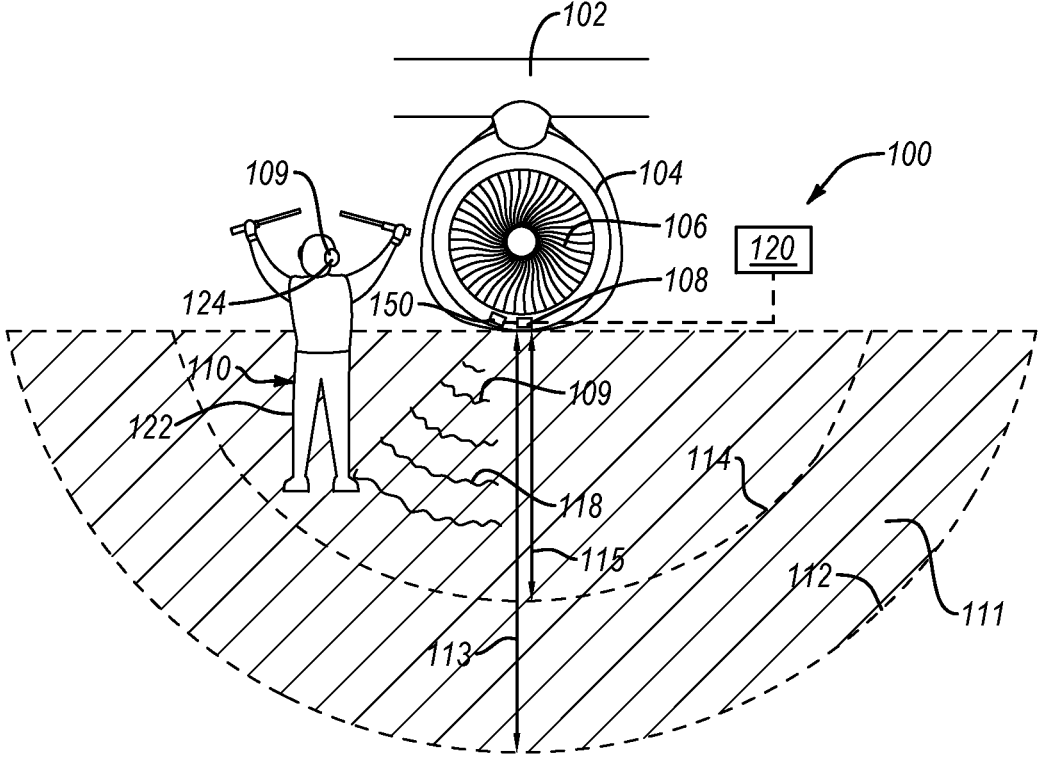
FIG. 2B is a schematic perspective view of the aircraft engine alert system of FIG. 1, with the movable object within a warning zone, according to one or more examples of the present disclosure.

As shown in FIG. 2B, the individual 122 is within the predetermined range 111, specifically the warning zone 114. Accordingly, the alert generating device 150 is issuing the alert 109, such as a warning alert 118, which initiated immediately upon the individual 122 entering the warning zone 114. In other words, the warning alert 118 is issued when the individual 122 is at or beyond the second distance 115. In some examples, the alert generating device 150 may continuously issue the warning alert 118 until the movable object 110 exits the warning zone 114. When the movable object 110 moves from the warning zone 114 to the pre-warning zone 112, the alert 109 transitions from the warning alert 118 to the pre-warning alert 116. Accordingly, in some examples, the pre-warning alert 116 is different from the warning alert 118, effectively notifying the movable object 110 of its specific zone location within the predetermined range 111. The pre-warning alert 116 and the warning alert 118, depicted as waves emanating from the sensor 108, can take various forms, including audible or visual alerts. In some examples, the warning alert 118 may exhibit a higher intensity and/or frequency compared to the pre-warning alert 116. In other examples, the warning alert 118 and the pre-warning alert 116 may take different alert forms. For example, the pre-warning alert 116 may be a visual alert, such as a blinking light, and the warning alert 118 may be an audible alert, such as an audible alarm.

Referring back to FIG. 1, commonly, ground crew members wear headsets at airports to facilitate communication and noise reduction. However, due to the noise reduction capabilities of some headsets, the wearer may not be able to hear audible alerts directly issued by the alert generating device 150. Accordingly, in some examples, the aircraft engine alert system 100 includes a headset 124 configured to be worn by an individual 122 when the individual 122 is in the proximity of the engine 104 of the aircraft 102. The headset 124 is configured to issue a headset-based alert (e.g., alert 109), such as via a speaker integrated into the headset 124, so that the individual 122 is able to hear the alert despite any noise reduction capabilities of the headset 124. The sensor 108 is in wireless communication with the headset

124 and configured to wirelessly transmit a signal to the headset 124 of the individual 122 to issue the headset-based alert to the headset 124 of the individual 122 when the engine 104 is in use and when the individual 122 is within the predetermined range 111 of the engine inlet 106. That is, the headset-based alert is an audible alert directly issued to the headset 124 of the individual 122. In some examples, the headset 124 is the alert generating device 150. That is, the headset 124 is configured to issue headset-based alert (i.e., the alert 109) to the movable object 110.

In some examples, the aircraft engine alert system 100 includes the headset 124, configured to issue the headset-based alert, and the alert generating device 150, configured to issue an engine-based alert, an alert emanating from the engine 104 (i.e., the alert 109). That is, the headset 124 is used in combination with the alert generating device 150. The headset-based alert and the engine-based alert are issued when the individual 122 is within the predetermined range 111 of the engine inlet 106 and wearing the headset 124. Accordingly, the headset 124 and the alert generating device 150 are both configured to issue an alert, including the alert 109 to the movable object 110. Although not shown, the aircraft engine alert system 100 may include eyewear, such as protective eyewear, worn by the individual 122. The alert generating device can be incorporated into the eyewear to provide a visual alert to the individual 122 wearing the eyewear of his/her proximity relative to the engine inlet 106.

In some examples, the aircraft engine alert system 100 may include a central monitoring system 120. The central monitoring system 120 is configured to communicate with the sensor 108, such that data, including any detection of movable objects and calculated distances of the movable object, are wirelessly transmitted to the central monitoring system 120. Additionally, the central monitoring system 120 may be in communication with the alert generating device 150, such that any alerts 109 issued by the alert generating device 150 are wirelessly transmitted to the central monitoring system 120. That is, while the alert generating device 150 issues a local alert for immediate proximity, the sensor 108 concurrently sends data to the central monitoring system 120 for broader awareness of the status of the sensor 108. The central monitoring system 120 is capable of receiving data from the sensor 108 encompassing information about the absence and presence of movable objects 110 within the predetermined range 111. Accordingly, the central monitoring system 120 allows for remote crew notifications, ensuring that alerts 109 issued by the alert generating device 150 are not only localized to the immediate vicinity but are also relayed to a remote location. As used herein, remote crew refers to an individual(s) who is situated at a location physically distant from the immediate vicinity of the aircraft engine. For example, remote crew may be located at a control center or other airport facilities. The central monitoring system 120 facilitates broader awareness among crew members, providing crew members with real-time updates on the status of the any movable objects detected by the sensor 108.

Figure 4:
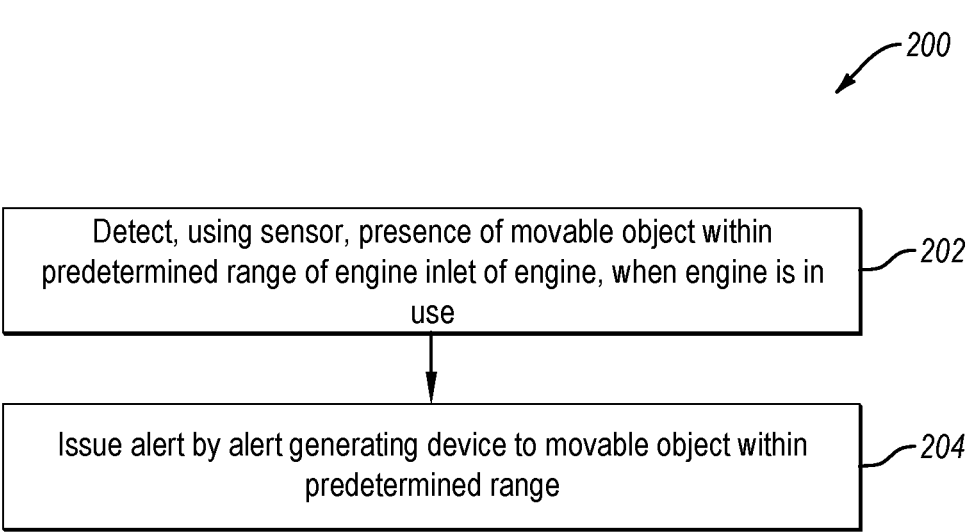
FIG. 4 is a schematic flow diagram of a method of alerting a movable object of a proximity of the movable object to an aircraft engine is use, according to one or more examples of the present disclosure.

Referring to FIG. 4, according to some examples, a method 200 of alerting a movable object 110 of a proximity of the movable object 110 to an aircraft engine is use is shown. The method 200 includes the step of (block 202) detecting, using a sensor 108, a presence of the movable object 110 within a predetermined range 111 of an engine inlet 106 of an engine 104 of an aircraft 102 when the engine 104 is in use. The movable object 110 may be any of various movable objects that may purposely or inadvertently move within the predetermined range 111. For example, the movable object 110 may be an individual, ground support equipment, or an animal. In some examples, the method 200 may include a plurality of sensors 108. For example, a plurality of sensors may be coupled to the engine 104 to provide redundancy and ensure reliability of the aircraft engine alert system 100. Moreover, a plurality of sensors may be used when the aircraft 102 has more than one engine, such that each engine of the aircraft 102 has at least one sensor coupled to each engine to detect the presence of the movable object within the predetermined range 111 of the corresponding engine. The step of detecting the presence of the movable object 110 within the predetermined range 111 may also include determining if the movable object 110 is within a pre-warning zone 112 or a warning zone 114 of the engine inlet.

The method 200 also includes the step of (block 204) issuing an alert 109 by the sensor 108 to the movable object 110 within the predetermined range 111. The alert 109 issued by the sensor 108 may include any of a variety of alerts including audible alerts and visual alerts, or a combination thereof. In some examples, the alert 109 is wirelessly transmitted to a headset 124 of an individual 122 to ensure that the individual is promptly informed if the individual enters the predetermined range 111 of the engine inlet 106. Moreover, in some examples, the alert 109 may be transmitted to a central monitoring system 120 for remote crew notification. When the predetermined range 111 includes a pre-warning zone 112 and a warning zone 114, the alert 109 issued by the sensor 108 may include issuing a pre-warning alert 116 when the movable object 110 is within the pre-warning zone 112 and issuing a warning alert 118 when the movable object 110 is within the warning zone 114.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. An aircraft engine alert system, comprising:
   an aircraft comprising at least one engine having an engine inlet;

a sensor coupled to the aircraft, wherein the sensor is configured to detect a movable object and determine a distance between the movable object and the engine inlet; and an alert generating device in electrical communication with the sensor and configured to issue an alert to the movable object when the at least one engine is in use and when the movable object is within a predetermined range of the engine inlet;

wherein:

within the predetermined range, a pre-warning zone begins a first distance away from the engine inlet and ends a second distance away from the engine inlet and a warning zone begins at the second distance away from the engine inlet and ends at the engine inlet, wherein the first distance is greater than the second distance;

the alert generating device is configured to issue a pre-warning alert when the movable object is within the pre-warning zone and issue a warning alert when the movable object is within the warning zone; and the pre-warning alert is different from the warning alert.

2. The aircraft engine alert system of claim 1, wherein the predetermined range is between, and inclusive of, fifteen feet and thirty feet.

3. The aircraft engine alert system of claim 1, wherein:

the first distance is between, and inclusive of, fifteen feet and thirty feet from the engine inlet; and the second distance is between, and inclusive of, ten feet and twenty feet from the engine inlet.

4. The aircraft engine alert system of claim 1, wherein the sensor comprises at least one active infrared sensor.

5. The aircraft engine alert system of claim 1, wherein the alert issued by the alert generating device comprises at least one of an audible alert and a visual alert.

6. The aircraft engine alert system of claim 1, wherein data from the sensor is transmitted wirelessly to a central monitoring system for remote crew notification.

7. The aircraft engine alert system of claim 1, wherein:

the aircraft is positioned on a ground surface; and the movable object is an individual.

8. The aircraft engine alert system of claim 7, wherein the alert generating device is a headset configured to be worn by the individual, wherein the sensor is configured to wirelessly transmit a signal to the headset of the individual to issue the alert to the headset of the individual.

9. The aircraft engine alert system of claim 1, wherein:

the aircraft is in flight; and the movable object is an animal.

10. The aircraft engine alert system of claim 1, wherein:

the predetermined range for issuing the alert is adjustable;

the predetermined range comprises a first predetermined range when the aircraft is positioned on a ground surface;

the predetermined range comprises a second predetermined range when the aircraft is in flight; and the first predetermined range is different from the second predetermined range.

11. The aircraft engine alert system of claim 1, wherein the alert generating device is configured to stop the alert to the movable object when the movable object moves outside of the predetermined range of the engine inlet.

12. The aircraft engine alert system of claim 1, wherein:

the sensor is configured to differentiate between different types of the movable object; and the alert issued by the alert generating device corresponds to a specific one of the different types of the movable object.

13. The aircraft engine alert system of claim 1, wherein the sensor is coupled to at least one engine of the aircraft.

14. An aircraft engine alert system, comprising:

an aircraft comprising at least one engine having an engine inlet;

a sensor coupled to the aircraft, wherein the sensor is configured to detect a movable object and determine a distance between the movable object and the engine inlet; and a headset in electrical communication with the sensor and configured to be worn by an individual, wherein the sensor is configured to wirelessly transmit a signal to the headset of the individual to issue an alert to the movable object, when the at least one engine is in use and when the individual is within a predetermined range of the engine inlet;

wherein:

within the predetermined range, a pre-warning zone begins a first distance away from the engine inlet and ends a second distance away from the engine inlet and a warning zone begins at the second distance away from the engine inlet and ends at the engine inlet, wherein the first distance is greater than the second distance;

the headset is configured to issue a pre-warning alert when the movable object is within the pre-warning zone and issue a warning alert when the movable object is within the warning zone; and the pre-warning alert is different from the warning alert.

15. The aircraft engine alert system of claim 14, further comprising an alert generating device coupled to the at least one engine and in electrical communication with the sensor, the alert generating device configured to issue an engine-based alert to the movable object when the at least one engine is in use and when the movable object is within the predetermined range of the engine inlet.

16. The aircraft engine alert system of claim 14, wherein the sensor is coupled to at least one engine of the aircraft.

17. A method of alerting a movable object of a proximity of the movable object to an aircraft engine in use, the method comprising steps of:

detecting, using a sensor, a presence of the movable object within a predetermined range of an engine inlet of an engine of an aircraft when the engine is in use; and issuing an alert by an alert generating device, in electrical communication with the sensor, to the movable object within the predetermined range;

wherein:

the step of detecting, using the sensor, the presence of the movable object within the predetermined range further comprises determining if the movable object is within a pre-warning zone or a warning zone of the engine inlet; and the step of issuing the alert by the alert generating device to the movable object further comprises issuing a pre-warning alert when the movable object is within the pre-warning zone and issuing a warning alert when the movable object is within the warning zone.

18. The method of claim 17, wherein the alert issued by the alert generating device comprises at least one of an audible alert and a visual alert.

19. The method of claim 17, further comprising wirelessly transmitting the alert to a central monitoring system for remote crew notification.

20. The method of claim 17, wherein the sensor is coupled to the engine of the aircraft.

* * * * *